Sept. 4, 1956 D. R. LAMBERT ET AL 2,761,623

RECORD COMPARISON MECHANISM FOR STATISTICAL MACHINES

Filed June 13, 1955 5 Sheets-Sheet 1

DONALD R. LAMBERT &
RONALD N. PIPER,
Inventors;

By [signature]
Attorney

DONALD R. LAMBERT &
RONALD N. PIPER
Inventor
By [signature]
Attorney

Sept. 4, 1956 D. R. LAMBERT ET AL 2,761,623

RECORD COMPARISON MECHANISM FOR STATISTICAL MACHINES

Filed June 13, 1955 5 Sheets-Sheet 3

DONALD R. LAMBERT &
RONALD N. PIPER,
Inventors

By [signature]
Attorney

DONALD R. LAMBERT &
RONALD N. PIPER,
Inventors
By [signature]
Attorney

DONALD R. LAMBERT
& RONALD N. PIPER,
Inventors
By [signature]
Attorney

United States Patent Office 2,761,623

Patented Sept. 4, 1956

2,761,623

RECORD COMPARISON MECHANISM FOR STATISTICAL MACHINES

Donald Rudolf Lambert, Carshalton, and Ronald Newman Piper, Tattenham, England, assignors to Powers-Samas Accounting Machines Limited, London, England, a British company Application June 13, 1955, Serial No. 515,157

Claims priority, application Great Britain July 22, 1954

4 Claims. (Cl. 235—61.7)

This invention relates to statistical machines controlled by records such as record cards or tapes and in particular to a device which, as a result of the sensing in a predetermined column or columns of a record, controls a function of a machine to which it is fitted and which is arranged to give an indication indicative of the fact that the data recorded on the sensed record differs in some predetermined respect from that of another record thereby to cause the machine to perform some predetermined function.

One of the predetermined functions which may be controlled by a device according to the invention is that of total-taking in a record controlled adding machine, for example a tabulating machine. A total-taking operation may be initiated during the passage of cards in succession through a machine by the sensing of a change of designation which indicates that a succeeding card belongs to a group of cards different from the group immediately preceding it. Designation sensing consists of the sensing of one or more columns in a predetermined field of a record in which field is recorded data indicative for example of a customer's identity number, or of a date.

Designation sensing is usually effected by a sensing device disposed in advance of the device by which other data is sensed from the cards and the arrangement is such that when, during feeding of cards to the machine, there is sensed a change from one group of records all bearing one designation to the first record of another group bearing a different designation, the device becomes operative to initiate a total-taking operation. This operation, by card control or pre-selection, may be either a sub-total-taking operation, a grand-total-taking operation, or a great-grand-total-taking operation. As will be understood, devices for controlling total-taking operations of a machine under control of designation sensing devices are already known and employed in the art and it is a main object of the present invention to provide a new form of such device which embodies a minimum of moving parts, which is easy to assemble and to dismantle for servicing, and which is economical to produce.

According to the present invention there is provided apparatus for controlling a function of a statistical machine controlled by statistical records, comprising a first and a second record analyzing device each including columnar electric index contacts, one index contact in each column for each columnar index position of a record, electric contact lines each connecting an index contact of said analyzing devices with an index contact of like significance in the other analyzing device, a first and a second electric selector contact for each index contact, an electric feed-in line making, through said contact lines, common electrical connection between the first selector contacts of like columns of the two analyzing devices, an electric feed-out line making common electrical connection between the second selector contacts of like columns of the two analyzing devices, a circuit-conditioning element for each said first and second selector contact and supported for cooperation with one or other of the selector contacts, said element in the inactive position thereof being engaged with said second selector contact, and at least one relay connected in said feed-out line for operation when a pulse is applied to the feed-in line and in the analyzing device a conditioning element of one device co-operates with its first selector contact and the conditioning element of like significance in the other of the devices co-operates with its second selector contact.

In one embodiment of the invention the index contacts and selector contacts for a column are provided on a contact leaf of electrically non-conductive material, each index contact being located at one end of a data-indicating contact line of electrically conductive material printed on the leaf, and the first and second contacts being respectively in electrical contact with a first and a second selector contact line of electrically conductive material printed on the leaf.

Two or more relays may be provided for manual pre-selection in the feed-out line.

In order that the invention may be clearly understood two embodiments thereof will now be described, by way of example, with reference to the accompanying diagrammatic drawings, in which.

Figure 4:
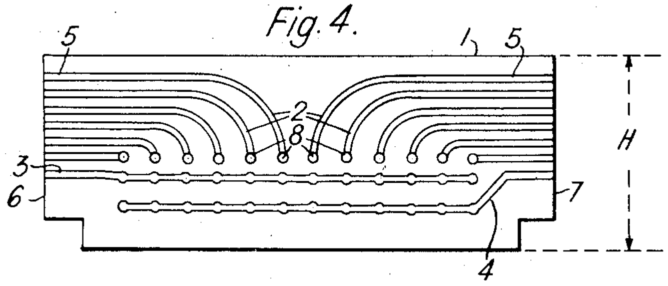
Fig. 4 shows one side of a contact leaf embodied in the apparatus.
Figure 5:
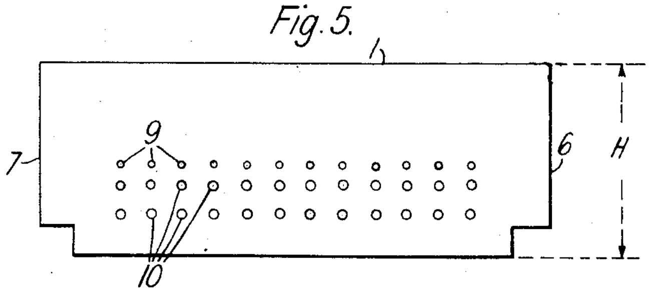
Figure 6:
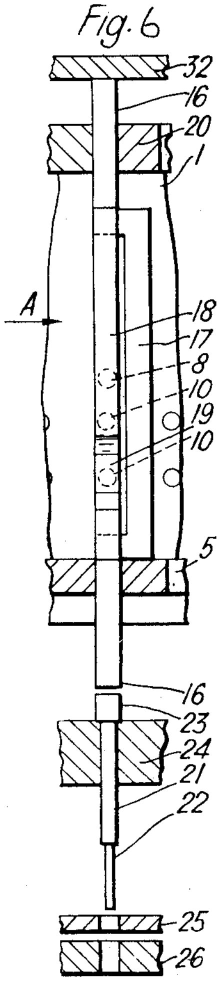
Figure 7:
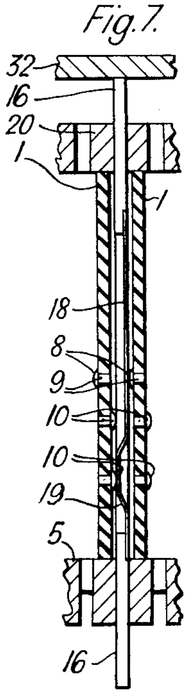
Figure 8:
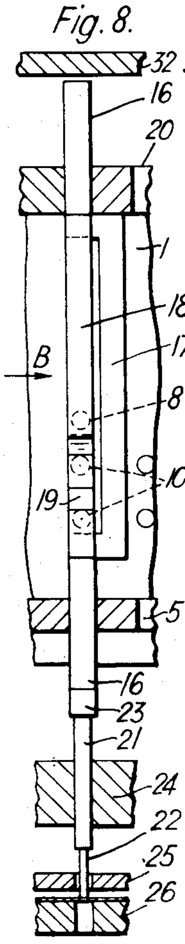
Figure 9:
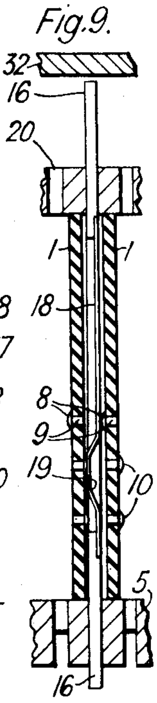
Figure 10:
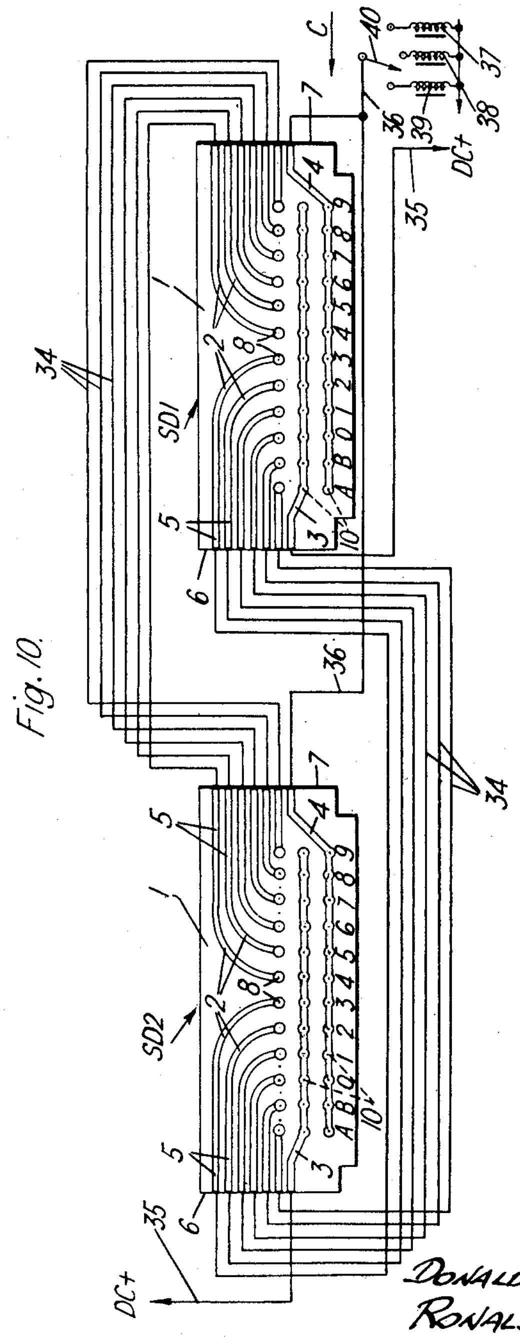
Figures 11, 12:
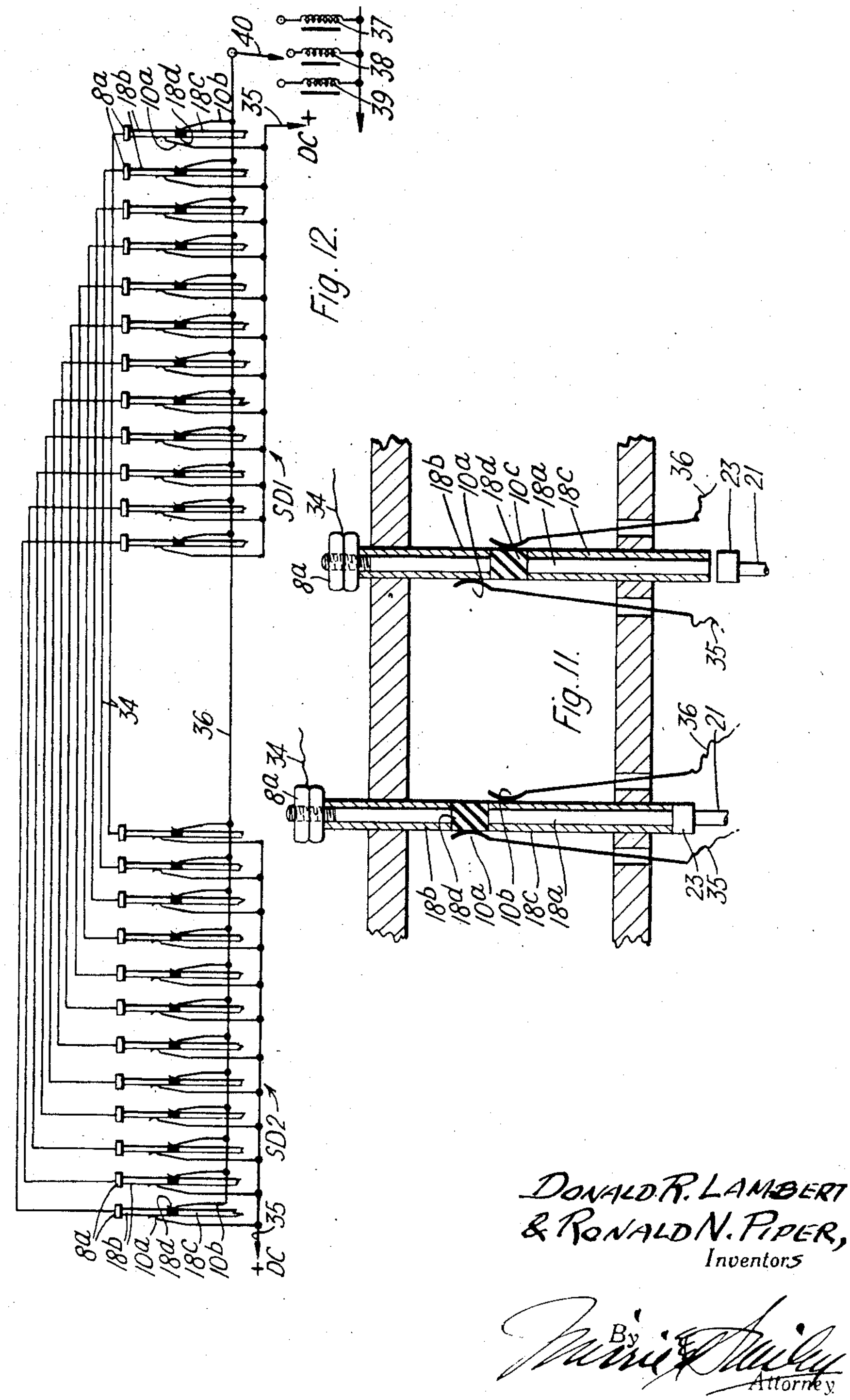

Fig. 5 shows the side of a contact leaf opposite the side thereof shown in Fig. 4, Fig. 6 is a side elevation, to an enlarged scale, illustrating the mode of operation of the apparatus, Fig. 7 is an end view of Fig. 6 looking in the direction of arrow A, Fig. 6, Fig. 8 is a view similar to Fig. 6, but showing the parts in different positions, Fig. 9 is an end elevation looking in the direction of arrow B, Fig. 8, Fig. 10 is a circuit diagram illustrating the manner in which a first and a second analyzing apparatus are connected to control a machine function, Fig. 11 diagrammatically illustrates a part of an alternative form of analyzing device, and Fig. 12 is a circuit diagram embodying the alternative form of analyzing device.

Apparatus according to the present invention embodies two analyzing devices for sensing records, hereinafter referred to as cards, but it is to be understood that the analyzing device per se as described with reference to Figs. 1 to 10 can be employed in apparatus other than that herein described and the description given below of this kind of analyzing device and of its mode of operation is given only in order that the present invention, which relates to the combination of two such sets of apparatus for a specific purpose, shall be clearly understood.

Referring to the drawings, each analyzing device comprises a plurality of contact leaves 1, of which one leaf is shown in detail in Figs. 4 and 5. The number of leaves 1 provided in the device is determined by the number of columns of a card to be sensed. Thus, for example, if the card is a 45 column card it will include forty-five leaves, if it is a 65 column card it will include sixty-five leaves, or if it is an 80 column card it will include eighty leaves. With the arrangement about to be described, however, in each instance the device will include one further leaf, the purpose of which will hereinafter appear, so that device for sensing a 45 column card will include forty-six leaves, for sensing a 65 column card will include sixty-six leaves, and for sensing an 80 column card will include eighty-one leaves.

Figure 1:
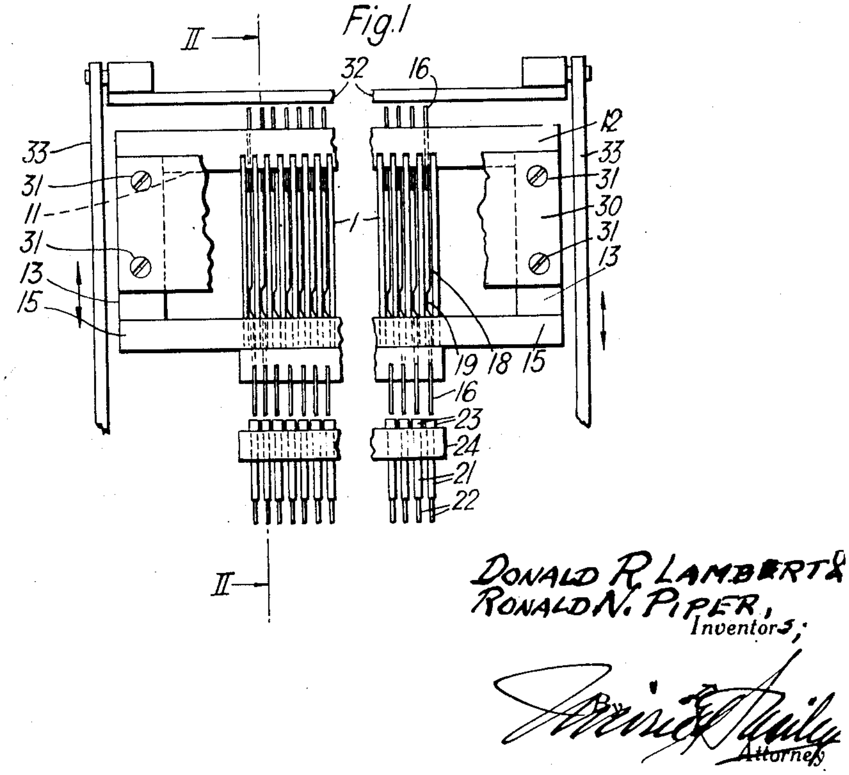
Fig. 1 is a side elevation of apparatus for analyzing perforated record cards, some parts of the apparatus being broken away more clearly to show other parts.

Each contact leaf 1 is made of a flat substantially rectangular piece of electrically non-conductive material of any desired thickness, although as can be seen particularly from Fig. 1 the thickness of the material can be relatively small, for example it may be of the order of $\frac{1}{32}$ inch. One side of each leaf is provided, as shown clearly in Figs. 2 and 4, with a plurality of lines of electrically conductive material, the lines being printed on the non-conductive material in known manner, forming no part of the present invention. As can be seen from Figs. 3 and 4, the printed lines of electrically conductive material include twelve data-indicating contact lines 2 together with a first selector contact line 3, and a second selector contact line 4. The data-indicating contact lines 2 correspond one each to a data-indicating position of a record column to be sensed on a card.

Figure 2:
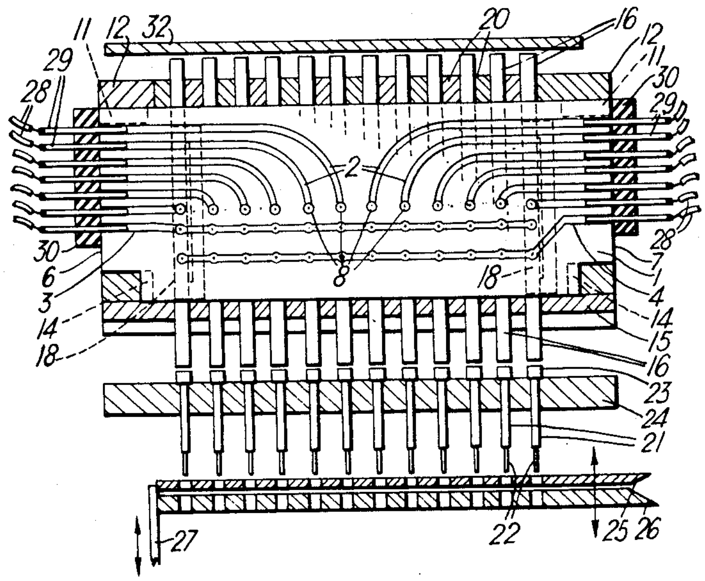
Fig. 2 is a section on line II—II, Fig. 1.

The data-indicating contact lines 2 are located in two groups and in each group on end 5, Fig. 4, of each line is located adjacent one of the opposite edges 6 or 7 of the contact leaf 1. The other end of each line is provided with columnar electric index contacts 8 shown as studs, the head of each stud making electrical contact with and standing proud of one end of the line 2. The studs 8 are arranged in a row across the contact leaf, as shown in Figs. 2 and 4, in positions spaced apart from each other so that when the contact leaves are in situ in the apparatus the centres of the studs 8 are aligned one with each of the data-indicating positions of a column of a card located in position for sensing each to be coincident with a line passing through the centre of a data-indicating position of a card column. The studs 8 extend through the contact leaf 1 so that the headless ends 9 thereof are located substantially in the plane of the opposite side of the leaf 1, as shown in Fig. 5. Between their ends the data-indicating contact lines 2 include portions which are spaced from each other and which are located one over the other in the plane of the contact leaf, as illustrated in Figs. 2 and 4. The arrangement of the data-indicating lines in two groups as just described is to permit the height H, Fig. 4, of the leaf to be reduced to a minimum, but it will be understood that, if desired, the ends of the lines remote from those provided with the studs 8 could all terminate adjacent the same edge of the contact leaf.

As can be seen from Figs. 2 and 4, each of the selector contact lines 3, 4 is parallel with a row of studs 8 and has one end thereof located adjacent an edge of the contact leaf and each line 3, 4 is provided with a number of selector contacts shown as studs 10 making electrical contact with the printed line and terminating in heads which stand proud from the reverse side of the leaf from the side on which the selector contact lines 3, 4 are printed, see Fig. 5. As can be seen from Figs. 2, 4 and 5, the studs 10 correspond in number to the studs 8, and are located to be directly beneath the studs 8.

The contact leaves 1 are supported in spaced side by side relation, as shown in Fig. 1, and are retained in their spaced positions by comb members 11 formed on the under-side of two bars 12, Fig. 2, secured to fix side plates 13 and by lower comb members 14 formed on a lower plate 15 also secured to the side plates 13. The arrangement of the contact leaves 1 is such that they can be lifted out of the bottom comb members 14 when the top combs 12 and combs 20 referred to below, are removed.

Between each pair of contact leaves 1 are located twelve circuit-conditioning elements, one for each pair of first and second selector contacts 10. Each circuit-conditioning element, as shown in Figs. 6 to 9, comprises a pair of aligned guide elements 16, spaced apart in a lengthwise direction and connected by a U-shaped element integral therewith. The base 17 of the U-shaped element is spaced laterally from and is parallel with the guide element 16. The circuit-conditioning element is completed by a beryllium copper contact spring 18 which is connected to, and extends lengthwise between, the guide elements 16, the contact spring 18 when the pin is in situ in the apparatus being arranged permanently to engage the head of the stud 8 appropriate thereto and to engage with one or other of a pair of studs 10 provided in the selector contact lines 3, 4. As can be seen from Figs. 6 to 9, in the arrangement of the apparatus as herein described, the contact spring 18 engages a stud 8 provided on one contact leaf and is provided with an out-set portion 19 which is engaged by a stud 10 of a selector contact line 3, 4 provided on the other of the two contact leaves 1 between which the circuit-conditioning element is located. It is because of this particular arrangement that the assemblage comprises one contact leaf 1 in excess of the number of card columns to be sensed, as mentioned above.

The guide elements 16 are located one in a top comb 20 secured to the top of the side frames 13 and the other in holes passing through the lower plate 15. The circuit-conditioning elements are supported by the top combs 20 and the holes in the lower plate 15 for lengthwise sliding movement and in the normal inactive positions thereof a circuit-conditioning element occupies the position thereof shown in Figs. 6 and 7 while in the active position thereof it occupies the position shown in Figs. 8 and 9.

The circuit-conditioning elements are movable from the inactive positions to the active positions thereof by sensing pins 21 each provided with a card sensing portion 22 and a head 23 for engagement with a lower guide element 16. The sensing pins 21 are supported for free lengthwise movement in a fixed plate 24 made of suitable electrically insulating material and upward lengthwise movement of the pins 21 is effected when an imperforate data-indicating position of a card is raised into engagement therewith, as illustrated in Figs. 8 and 9. It is to be understood, however, that if desired the sensing pins 21 may be dispensed with and the ends of the lower guide elements 16 shaped suitably so that they will perform the functions of the pins 21 to effect sensing of a record.

A card to be sensed is fed, by any suitable known means, into a card chamber consisting, in known manner, of an upper plate 25 and a lower plate 26. A card to be sensed is located, as is customary, between the plates by a card stop 27, Fig. 2. The card stop 27, as is usual, is reciprocable into and out of the path of cards being delivered to and moved from the card chamber 25, 26, and in the embodiment of the invention herein described, the arrangement is such that when a card is arrested by the stop 27, the card chamber 25, 26 is reciprocated, in known manner not shown, from the lower position thereof illustrated in Fig. 6 to the upper position thereof illustrated in Fig. 8. Accordingly, if during the upward movement of the chamber 25, 26 a sensing pin 21, or the lower guide element 16 if such is used as a sensing element, is engaged by an imperforate data-indicating portion of a card, the pin 21 is raised, as shown in Fig. 8, and during its upward movement it engages the lower guide element 16 co-operating therewith hereby to effect upward movement of the circuit-conditioning element of which the guide element 16 is a part. This upward movement of the circuit-conditioning element causes the out-set portion 19 of the contact spring 18 to be moved out of engagement with the lower of the studs 10 with which it co-operates and into engagement with the upper of the studs 10, as shown clearly in Figs. 7 and 9.

The printed contact lines and the contact leaves 1 are connected in electric circuits so as to control machine functions according to the perforation patterns of a record card, for example the printed contact lines may be connected to accumulator mechanism, or to apparatus for effecting printing, or some of the printed contact lines may be pre-selected for connection in electric circuits to control special functions of the machine to which the apparatus is fitted, or the apparatus may be embodied in a comparing machine or in a machine known as an interpolator.

Figure 3:
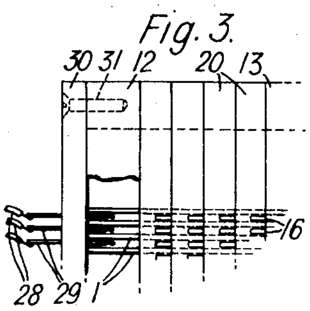
Fig. 3 is a top plan of a part of Fig. 2.

To facilitate the manufacture and servicing of the apparatus, the leads 28, Figs. 2 and 3, are not connected directly to the ends of the printed lines adjacent the edges of the contact leaves, but are connected to spring contact elements 29 supported by a detachable contact carrier 30 made of insulating material; the carrier 30 being connected to the side frames 13 by screws 31, or by any other suitable means, permitting the easy detachment of the carrier from the apparatus.

During a sensing operation, electrical potential is applied, for example by a rotary switch not shown, to the leads 28 in timed relation with the reciprocating movement of the card chamber 25, 26, and the arrangement is such that each circuit is normally conditioned to pass the current when the circuit-conditioning elements are in the normal inactive positions thereof, as shown in Fig. 7, and the circuit is broken when a circuit-conditioning element is raised to the active position thereof as shown in Fig. 9. Thus, if a circuit-conditioning element is not raised, thereby indicating that the end 22 of its co-operating sensing pin 21 has passed through a card perforation, the circuit controlled by that element will remain closed so that the appropriate machine function is performed when potential is applied to the leads 28.

The tension in the contact spring 18 is such that the circuit-conditioning element of which it is a part will remain in the inactive or active position thereof until the element is moved positively from such position. It will therefore be understood that actuated circuit-conditioning elements can be retained in the active positions thereof for any desired period of time after a sensing operation and will not be disturbed until positive action is taken to restore them to the inactive positions thereof. This positive action is provided by a restoring plate 32 common to all of the circuit-conditioning elements of the apparatus. As diagrammatically illustrated in Fig. 1, the restoring plate 32 is operated by reciprocable links 33, operation of which is effected in any suitable manner, not shown, as for example by a cam operating in timed relation with the reciprocating movements of the card chamber 25, 26. In Figs. 6 and 7, the restoring plate 32 is illustrated as having just completed the return of a circuit-conditioning element to the normal inactive position thereof. It will, however, be understood that the plate 32 is raised out of engagement with the circuit-conditioning elements immediately it has restored active elements to the inactive positions thereof.

Referring to Fig. 10 is diagrammatically illustrated therein one column for each of a first analyzing device SD1, as described above, and a second similar analyzing device SD2. It will be understood that, although in Fig. 10 there is illustrated for each sensing device only one contact leaf 1, the analyzing device SD2 will normally include a contact leaf for every column of a card, together with one additional leaf as described above and, if desired, the analyzing device SD1 may include a like number of contact leaves 1. If desired, however, the analyzing device SD1 may comprise a number of contact leaves 1 sufficient only to sense the card field containing the designation data, together with, of course, one extra contact leaf, for example if the designation field of a card consists of six card columns to accommodate a six-figure number, the analyzing device SD1 will comprise seven contact leaves 1. It will also be understood that in the event that the first analyzing device SD1, which is commonly known in the art as a pre-sensing unit, should consist of a full set of contact leaves 1, then since only the designation field is to be sensed by the pre-sensing unit SD1, only the appropriate contact leaves 1 thereof will be connected to corresponding contact leaves, that is leaves of like significance, in the analyzing device SD2.

As can be seen from Fig. 10, the ends 5 of the data-indicating contact lines 2 of a contact leaf 1 of the pre-sensing unit SD1 are connected by contact lines 34 with the ends 5 of data-indicating contact lines 2 of like significance on the corresponding columnar contact leaf 1 of the second analyzing unit SD2. The first selector contact line 3 of each of the corresponding contact leaves 1 is connected, through lines 34, to feed-in line 35 and the second selector contact lines 4 of the corresponding contact leaves are connected to a feed-out line 36 which, through a plug board not shown, is electrically connected with a first relay 37 arranged to control taking of a sub-total, a second relay 38 arranged to control taking of a grand-total, and a third relay 39 arranged to control taking of a great-grand-total. A suitable manually operated switch or plug 40 may be provided to pre-select the relay 37, 38, or 39 which is to control the taking of a total and which is energized by an impulse passing along the feed-out line 36. If, as is usual, a total-taking operation is initiated as a result of the sensing of a change of designation from a card field consisting of two or more card columns, the line 36 will be common to each of the pairs of contact leaves 1 provided for the sensing of the designation field of the cards.

When the machine is in operation, cards are delivered from a magazine, not shown, in the direction of the arrow C, Fig. 10, and each card is first arrested to be sensed by the pre-sensing unit SD1 and thereafter by the second analyzing device SD2, the card being sensed for a second time by the analyzing device SD2, this second operation taking place simultaneously with the sensing by the presensing unit SD1 of the next succeeding card.

Let it be assumed that one card is in position for sensing in the analyzing device SD1 and another is in position for sensing in the analyzing device SD2 and that in the designation field of the card in the column being sensed by the apparatus shown in Fig. 10, each card bears a perforation indicative of the digit "2." In these circumstances, in the two devices SD1 and SD2, the sensing pins of like significance and which sense the "2" position of the card columns pass through the perforation provided in these positions and all the remaining sensing pins of the column in both analyzing devices are raised so that the outset portions 19 of the raised circuit-conditioning elements are moved out of engagement with the selector contacts 10 in the second selector contact line 4 and into engagement with the selector contacts 10 of the first selector contact line 3. Thus, on application of an impulse to the feed-in line 35, the impulse is fed back to the feed-in line 35 by each of the raised circuit-conditioning elements and in each analyzing device the input circuit to the index contact 8 representative of the sensed digit "2" is broken because the circuit-conditioning elements for those positions remain in the inactive conditions thereof.

If now there is a card presented for sensing by the pre-sensing unit SD1 and another by the analyzing device SD2 and the card in apparatus SD2 should have a perforation in the No. 2 data-indicating position thereof while the card in the pre-sensing unit SD1 has a perforation in the No. 3 data-indicating position thereof, there will be indicated a condition of disagreement between the pre-sensing unit SD1 and the analyzing device SD2, this disagreement being indicative of the fact that, before the card in the pre-sensing unit SD1 is sensed by the analyzing device SD2, a total-taking operation is required. This indication is afforded as the result of the condition of the analyzing devices in which in the pre-sensing unit SD1, the circuit-conditioning element for the No. 3 position remains in the inactive position thereof while, in the analyzing device SD2, the circuit-conditioning element for the No. 2 position remains in the inactive position. Accordingly, when an impulse is applied to the feed-in lines 35, the circuit-conditioning element for the No. 2 position of the pre-sensing unit SD1 is in the active position thereof and an impulse passes via the line 34 connected to the index contact pin 8 for the No. 2 position to the index contact pin 8 of the No. 2 position in the analyzing device SD2. However, in the analyzing device SD2, the circuit-conditioning element for this position is in the inactive position thereof so the impulse passes to the second selector line 4 of unit SD2 and to the feed-out line 36 to effect actuation of the appropriate one of the relays 37, 38, 39. Accordingly, it will be understood that, irrespective of the number of columns comprising the designation field of the card, disagreements sensed in any column of the designation field during the simultaneous operation of the units SD1 and SD2 will result in an impulse being applied to the line 36 to effect actuation of the appropriate relay.

Figs. 11 and 12 illustrate an alternative embodiment of the invention in which there are employed two like analyzing devices of a form different from that described above although, as can be seen from Fig. 12 the circuit arrangement according to the invention for effecting comparing of two records is the same as that described with reference to Fig. 10.

In this alternative embodiment of the invention, as can be seen from Fig. 11, there is provided in an analyzing device, for each card index position to be sensed thereby, a first selector contact 10*a* and a second selector contact 10*b*. The index contact 8*a* is carried by the circuit-conditioning element for movement therewith and the circuit-conditioning element comprises a rod-like jack, supported for lengthwise movement under control of a sensing pin 21 and a restoring element 32, and consisting of an electrically conductive pin 18*a* intimately engaged by electrically conductive sleeves 18*b*, 18*c* separated one from the other by an electrically insulating sleeve 18*d*. In the inactive position of the circuit-conditioning element the first selector contact 10*a* is engaged with the sleeve 18*b* and the second selector contact 10*b* is engaged with the insulating sleeve 18*d*; in the active position of the circuit-conditioning element, as illustrated at the left of Fig. 11, the contact 10*a* is engaged by the insulating sleeve 18*d* and the contact 10*b* is engaged by the conductive sleeve 18*c*. The index contacts 8*a* of like significance in like columns of the two units SD1, SD2 are connected by contact lines 34, the first selector contacts 10*a* are connected with a feed-in line 35, and the second selector contacts 10*b*, are connected with a feedout line 36, as shown in Fig. 12, so that the apparatus operates in the manner described above with reference to Fig. 10.

We claim:

1. Apparatus for controlling a function of a statistical machine controlled by statistical records, comprising a first and a second record analyzing device each including columnar electric index contacts, one index contact in each column for each columnar index position of a record, electric contact lines each connecting an index contact of one said analyzing device with an index contact of like significance in the other analyzing device a first and a second electric selector contact for each index contact, an electric feed-in line making, through said contact lines, common electrical connection between the first selector contacts of like columns of the two analyzing devices, an electric feed-out line making common electrical connection between the second selector contacts of like columns of the two analyzing devices, a circuit-conditioning element for each said first and second selector contact and supported for co-operation with one or other of the selector contacts, said element in the inactive position thereof being engaged with said second selector contact, and at least one relay connected in said feed-out line for operation when a pulse is applied to the feed-in line and in the analyzing device a conditioning element of one device co-operates with its first selector contact and the conditioning element of like significance in the other of the devices co-operates with its second selector contact.

2. Apparatus according to claim 1, wherein the index contacts and selector contacts for a column are provided on a contact leaf of electrically non-conductive material each index contact being located at one end of a data-indicating contact line of electrically conducting material printed on the leaf, and the first and second selector contacts being respectively in electrical contact with a first and a second selector contact line of electrically conductive material printed on the leaf.

3. Apparatus according to claim 1, where two or more relays are manually pre-selectable for connection in the feed-out line.

4. Apparatus according to claim 2, wherein two or more relays are manually pre-selectable for connection in the feed-out line.

No references cited.